June 24, 1958 U. W. RICHARDSON ET AL 2,840,326
AERODYNAMIC BRAKE FOR AIRCRAFT
Filed Dec. 24, 1949 2 Sheets-Sheet 1
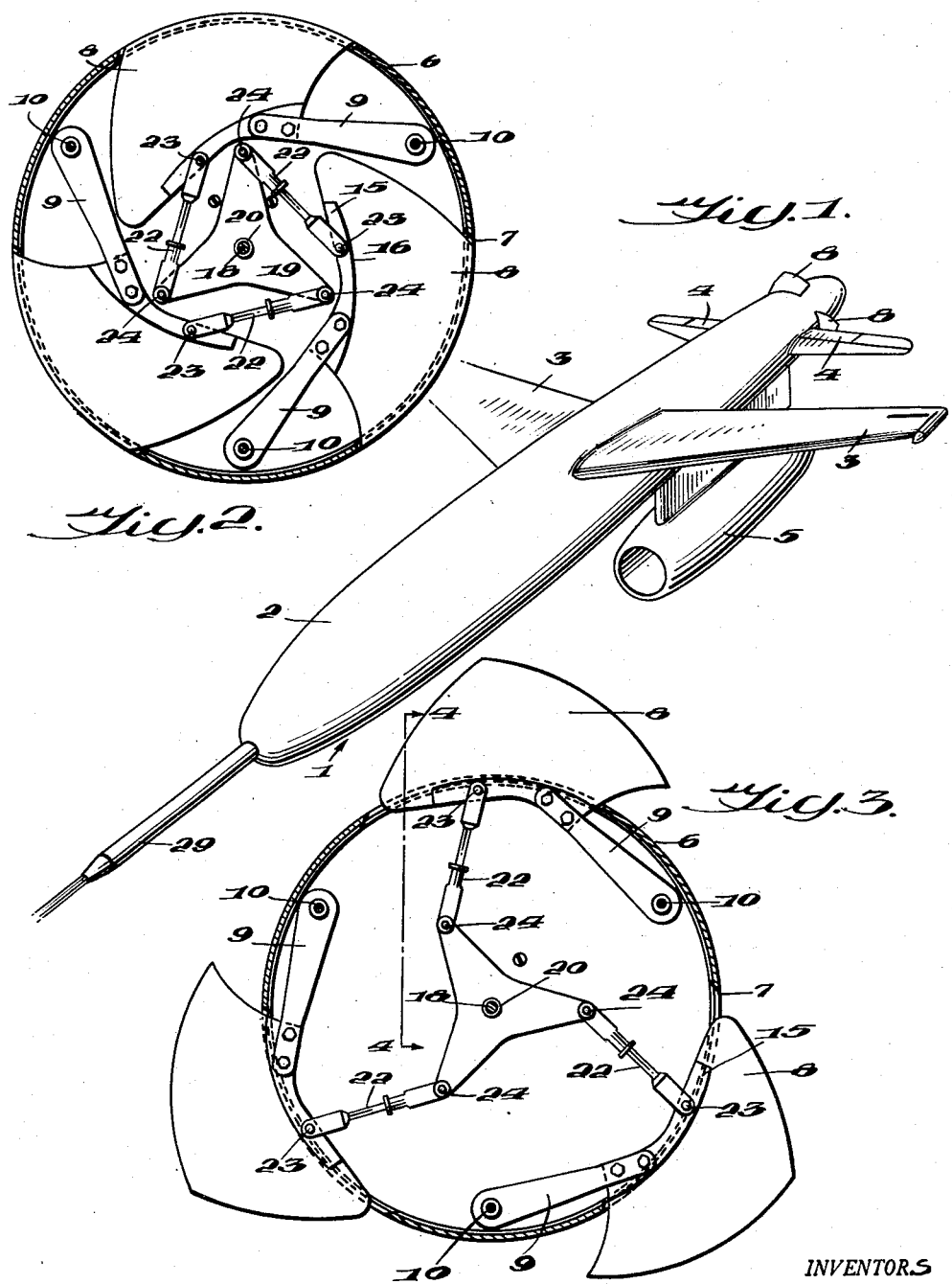
INVENTORS
URBAN W. RICHARDSON,
JOHN DONALD RAUTH,
BY
Martin E. Hogan Jr.
ATTORNEY

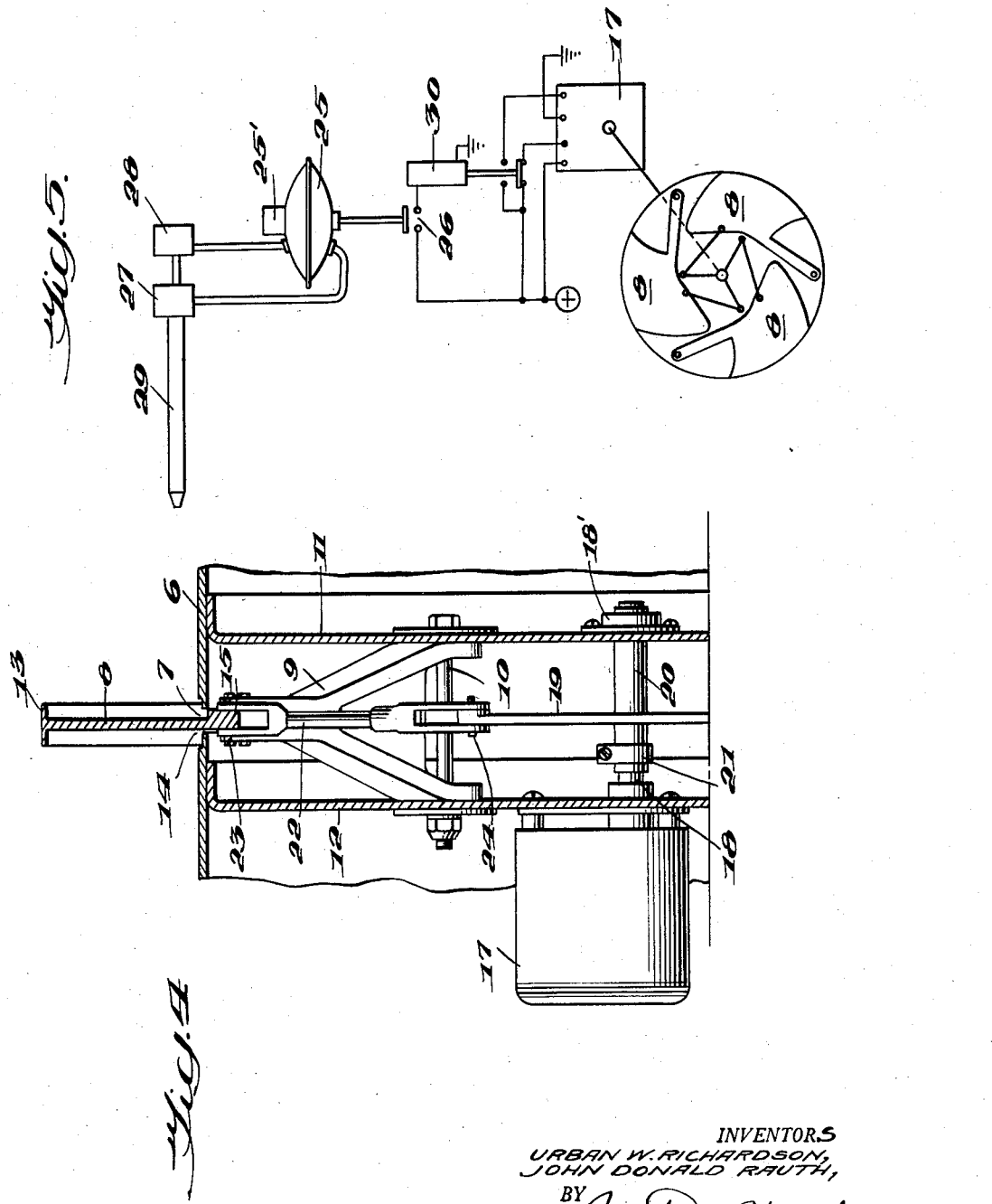

United States Patent Office 2,840,326
Patented June 24, 1958

---

2,840,326

AERODYNAMIC BRAKE FOR AIRCRAFT

Urban W. Richardson, Baltimore, and John Donald Rauth, Middle River, Md., assignors to The Martin Company, a corporation of Maryland Application December 24, 1949, Serial No. 134,906

5 Claims. (Cl. 244—113)

This invention relates to an improved aerodynamic brake for controlling the speed of aircraft.

In controlling pilotless aircraft, it is frequently desirable to be able to maintain a relatively constant, pre-set velocity of the aircraft. The brake of this invention is especially well adapted for such a purpose.

It is an object of this invention to provide an aerodynamic brake for an aircraft which is relatively compact and which may be controlled with a minimum of actuating force.

It is a further object to provide an aerodynamic brake comprising a plurality of vanes, normally nested within the fuselage of an aircraft, and projectible at substantially right angles to the direction of movement of the aircraft into the airstream to slow down the aircraft.

Further and other objects will become apparent after a consideration of the following description and claims when taken in view of the drawing.

In the drawing:

Figure 1 is a perspective view of a pilotless aircraft provided with the aerodynamic brake of this invention, the brake being shown in operative position.

Figure 2 is a transverse sectional view through the rear portion of the aircraft showing the brake vanes in retracted condition.

Figure 3 is a corresponding view showing the brake vanes fully extended.

Figure 4 is a fragmentary sectional view taken along the section line 4—4 in Figure 3.

Figure 5 is a diagrammatical view of the brake control means.

The brake of this invention is shown in Figure 1 applied to a pilotless aircraft 1 having a fuselage 2, wings 3, tail surfaces 4, and propelled by a ram jet engine 5 slung below the rear portion of the fuselage. Adjacent the rear end of the fuselage, the outer skin 6 is provided with a plurality of slots 7 through which aerodynamic brake vanes 8 are adapted to be projected. Each of the brake vanes 8 includes an arm 9 having its free end pivotally mounted on a cross shaft 10 located adjacent the peripheral wall of said fuselage and extending between, and supported by, a pair of longitudinally spaced bulkheads 11 and 12. As is best shown in Figures 2 and 3 the outer peripheral edge of each of the vanes is curved to conform with the circular curvature of the skin so that when the vane is fully retracted as in Figure 2, the flanges 13 formed along the outer edge will nest in a suitable groove 14 formed in the skin 6. The opposite or inner edge of each of the vanes is provided with a relatively thick reinforcing portion 15 to which the arm 9 is suitably attached.

To extend and retract the brake vanes 8, a reversible torque-type electrical motor 17 is supported from the rearward bulkhead 12 so that its shaft 18 extends axially through the center of the bulkhead. Carried by the shaft 18 is a three-armed spider 19 which includes a sleeve 20 clamped as at 21 to shaft 18 so as to rotate therewith. The sleeve and shaft are suitably supported from bulkhead 11 by means of a bearing assembly 18' carried by the bulkhead 11. Links 22 are pivoted at 23 to the vanes and at 24 to the spider arms as clearly shown in Figures 2, 3 and 4.

While any known control means could be used for controlling the motor 17, the arangement shown in Figure 5 has been found to be particularly useful in conjunction with the particular type of pilotless aircraft shown. In this arrangement projection or retraction of the vanes is under the control of a differential pressure responsive switch 25 which is arranged to close a control circuit to project the vanes whenever a predetermined pressure differential is applied to the pressure elements of the switch. In the present case one side of this pressure control switch is connected to a static pressure chamber 27 and the other side to a dynamic pressure chamber 28, said chambers being in communication with a Pitot tube assembly 29 shown projecting forwardly from the nose of the fuselage in Figure 1. Switch 25 is provided with an altitude compensating device 25', by means of which the pressure differential required to close the contacts 26 may be corrected for the altitude at which the aircraft is operating so that the switch will be actuated at the desired predetermined speed. This is necessary since the difference between the dynamic and static pressures for a particular speed varies at different altitudes. When electric contact is made at 26 a relay 30 will be energized which in turn will complete a circuit to the motor 17 so as to cause it to rotate in the direction to extend the vanes. Conversely whenever the speed falls below the predetermined value the control circuit will be opened at 26, thus deenergizing the relay 30, which in turn will complete a circuit to the motor to cause it to rotate in reverse so as to retract the vanes. Suitable limit switches (not shown), such as are normally provided in a motor of this type, may be employed to deenergize the motor when the vanes are fully extended or fully retracted.

The operation of the brake is believed obvious from the above description. Normally the brakes will be in their fully retracted position as shown in Figure 2. However when the velocity of the aircraft exceeds a predetermined value, pressure switch 25 will cause the motor 17 to extend the vanes; as soon as the velocity falls below the predetermined value due to the increased drag, the motor will be reversely energized to again retract the vanes. By arranging the vanes as shown in the drawing an extremely compact assembly is produced, yet a relatively large and aerodynamically effective braking surface is produced when the vanes are fully extended. Since the vanes are projected substantially at right angles to the direction of movement of the aircraft there is no appreciable aerodynamic action tending to either retract or extend the vanes. As a result a relatively light and compact actuating mechanism is adequate to operate them. Since the vanes, when retracted, do not extend beyond the periphery of the fuselage, they produce no drag under these conditions, an objectionable feature of previously proposed aerodynamic brakes.

By arranging the vanes symetrically about the longitudinal axis of the fuselage, the drag forces with the vanes extended will be balanced, thus eliminating any tendency to produce turning moments on the aircraft which might otherwise adversely affect the control of the aircraft.

While but a single set of three vanes lying in a common plane has been shown in the drawing it is obvious that the number and arrangement of the vanes in a set and the number of sets of vanes can be varied without departing from the spirit of the invention, depending upon the total drag area desired for any particular installation.

While but one form of the invention has been described it is obvious that many other alterations and modifications can be made without in any way departing from the spirit and scope of the appended claims. As used in the description and claims, the term fuselage is intended to comprehend any equivalent longitudinally extending elongated body portion of aircraft.

We claim as our invention:

1. An aerodynamic brake for an aircraft having a fuselage of substantially circular cross section, a plurality of brake vanes arranged substantially perpendicular to the longitudinal axis of said fuselage and each including an arm portion, means pivotally connecting said arm portions to the fuselage interiorly of but adjacent the peripheral wall of said fuselage for limited swinging movement in a plane sustantially perpendicular to the longitudinal axis of said fuselage, the outer edges of said vanes being curved to substantially conform with the curvature of said fuselage, the wall of said fuselage being provided with slots adjacent said vanes, and actuating means for said vanes disposed inwardly thereof adjacent the said axis of said fuselage and connected to the vanes adjacent their inner edges for extending and retracting said vanes through said slots to control the speed of said aircraft.

2. An aerodynamic brake for an aircraft having a fuselage, comprising a brake vane arranged substantially perpendicular to the longitudinal axis of said fuselage and including an arm extending from the inner edge of said vane and rigid therewith, means pivotally connecting said arm to said fuselage on a fixed axis located at a point interiorly of but adjacent the peripheral wall of said fuselage for bodily swinging of said vane about said pivot axis in a plane substantially perpendicular to the longitudinal axis of said fuselage, said fuselage being provided with a slot adjacent said vane, and means for swinging said vane about said pivot to extend and retract said vane through said slot to control the speed of said aircraft.

3. An aerodynamic brake for an aircraft having a fuselage, comprising a brake vane arranged substantially perpendicular to the longitudinal axis of said fuselage and including an arm extending from the inner edge of said vane and rigid therewith, means pivotally connecting said arm to said fuselage on a fixed avis located at a point interiorly of but adjacent the peripheral wall of said fuselage for bodily swinging of said vane about said pivot axis in a plane substantially perpendicular to the longitudinal axis of said fuselage, said fuselage being provided with a slot adjacent said vane, and means for swinging said vane about said pivot to extend and retract said vane through said slot to control the speed of said aircraft, said vane when retracted lying entirely within the limits of said fuselage.

4. An aerodynamic brake for an aircraft having a fuselage, comprising a brake vane arranged substantially perpendicular to the longitudinal axis of said fuselage and including an arm extending from the inner edge of said vane and rigid therewith, means pivotally connecting said arm to said fuselage on a fixed axis located at a point interiorly of but adjacent the peripheral wall of said fuselage for bodily swinging of said arm and vane about said pivot axis in a plane substantially perpendicular to the longitudinal axis of said fuselage, said fuselage being provided with a slot adjacent said vane, and means for swinging said vane about said pivot to extend and retract said vane through said slot to control the speed of said aircraft, said vane having its outer edge shaped to conform to the exterior of said fuselage adjacent said slot, whereby when retracted said vane will be entirely within the limits of said fuselage.

5. An aerodynamic brake for an aircraft having a fuselage, comprising a plurality of brake vanes symmetrically disposed about the longitudinal axis of said fuselage, each being pivoted to said fuselage at a point interiorly of but adjacent the peripheral wall thereof for swinging in a plane substantially perpendicular to the longitudinal axis of said fuselage, said fuselage being provided with a slot adjacent each vane, and means for conjointly extending and retracting said vanes through said slots to control the speed of said aircraft, said means comprising an actuating crank having a plurality of crank arms, one for each vane, and links connecting said crank arms to the inner edge of said vanes, said crank being disposed adjacent the said axis of said fuselage whereby said crank and links will be nested inwardly of said vanes when the vanes are in retracted position.

References Cited in the file of this patent

UNITED STATES PATENTS

| 1,773,521 | Davis | Aug. 19, 1930 |
| 1,879,187 | Goddard | Sept. 27, 1932 |
| 2,116,276 | McLeod | May 3, 1938 |
| 2,204,404 | Driggs | June 11, 1940 |
| 2,421,870 | Dornier et al. | June 10, 1947 |
| 2,460,843 | Ours | Feb. 8, 1949 |

FOREIGN PATENTS

| 507,103 | Great Britain | June 9, 1939 |
| 539,842 | France | Apr. 7, 1922 |
| 891,348 | France | Dec. 11, 1943 |
| 914,026 | France | June 11, 1946 |